(12) United States Patent
Tsujimoto

(10) Patent No.: US 9,135,530 B2
(45) Date of Patent: Sep. 15, 2015

(54) PRINTER POSITION DETERMINATION AND SELECTION FOR A TERMINAL APPARATUS AND SYSTEM

(71) Applicant: Shohei Tsujimoto, Nagoya (JP)

(72) Inventor: Shohei Tsujimoto, Nagoya (JP)

(73) Assignee: Brothe Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/166,887

(22) Filed: Jan. 29, 2014

(65) Prior Publication Data
US 2014/0211252 A1    Jul. 31, 2014

(30) Foreign Application Priority Data
Jan. 29, 2013  (JP) ................................ 2013-014867

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |
| *H04W 4/00* | (2009.01) |

(Continued)

(52) U.S. Cl.
CPC ............ *G06K 15/007* (2013.01); *G06F 3/1204* (2013.01); *G06F 3/1226* (2013.01); *G06F 3/1236* (2013.01); *G06F 3/1268* (2013.01); *G06F 3/1292* (2013.01); *G06K 15/402* (2013.01); *H04W 4/008* (2013.01); *H04W 4/023* (2013.01); *H04L 67/1021* (2013.01); *H04L 67/16* (2013.01)

(58) Field of Classification Search
CPC .. G06K 15/007; G06K 15/402; G60F 3/1204; G60F 3/1226; G60F 3/1236; G60F 3/1292; G60F 3/1268

USPC .......................... 358/1.1, 1.15, 1.13
See application file for complete search history.

(56) References Cited

U.S. PATENT DOCUMENTS

| | | |
|---|---|---|
| 8,749,823 B2 | 6/2014 | Kato |
| 2008/0184162 A1 | 7/2008 | Lindsey et al. |

(Continued)

FOREIGN PATENT DOCUMENTS

| | | |
|---|---|---|
| JP | 2002-101456 A | 4/2002 |
| JP | 2004-070518 A | 3/2004 |

(Continued)

OTHER PUBLICATIONS

Jan. 5, 2015—(EP) Extended Search Report—App 14153103.8.

*Primary Examiner* — Douglas Tran
(74) *Attorney, Agent, or Firm* — Banner & Witcoff, Ltd.

(57) ABSTRACT

A terminal apparatus includes: a first position receiving unit configured to receive terminal position information indicating a position of the terminal apparatus; a receiving unit configured to receive a plurality of distance information corresponding to each of printers that are printer candidates to execute a printing, wherein each of the plurality of distance information is generated on the basis of coordinate information, which includes information of a latitude and a longitude indicating a position of the corresponding printer, and the terminal position information; a choosing unit configured to preferentially choose a printer having a short distance to the terminal apparatus from the printers based on the distance information; and a printing instruction unit configured to transmit a printing instruction for printing execution to a specific printer of the one or more chose printers.

22 Claims, 10 Drawing Sheets

(51) Int. Cl.
*H04W 4/02* (2009.01)
*H04L 29/08* (2006.01)

(56) References Cited

U.S. PATENT DOCUMENTS

2011/0292445 A1    12/2011  Kato
2013/0342870 A1*   12/2013  Kodimer et al. ............. 358/1.15
2014/0049797 A1*    2/2014  Huster ........................ 358/1.15

FOREIGN PATENT DOCUMENTS

| | | |
|---|---|---|
| JP | 2004-110587 A | 4/2004 |
| JP | 2005-223436 A | 8/2005 |
| JP | 2006-012091 A | 1/2006 |
| JP | 2006-195765 A | 7/2006 |
| JP | 2006-209536 A | 8/2006 |
| WO | 2010107125 A1 | 9/2010 |

\* cited by examiner

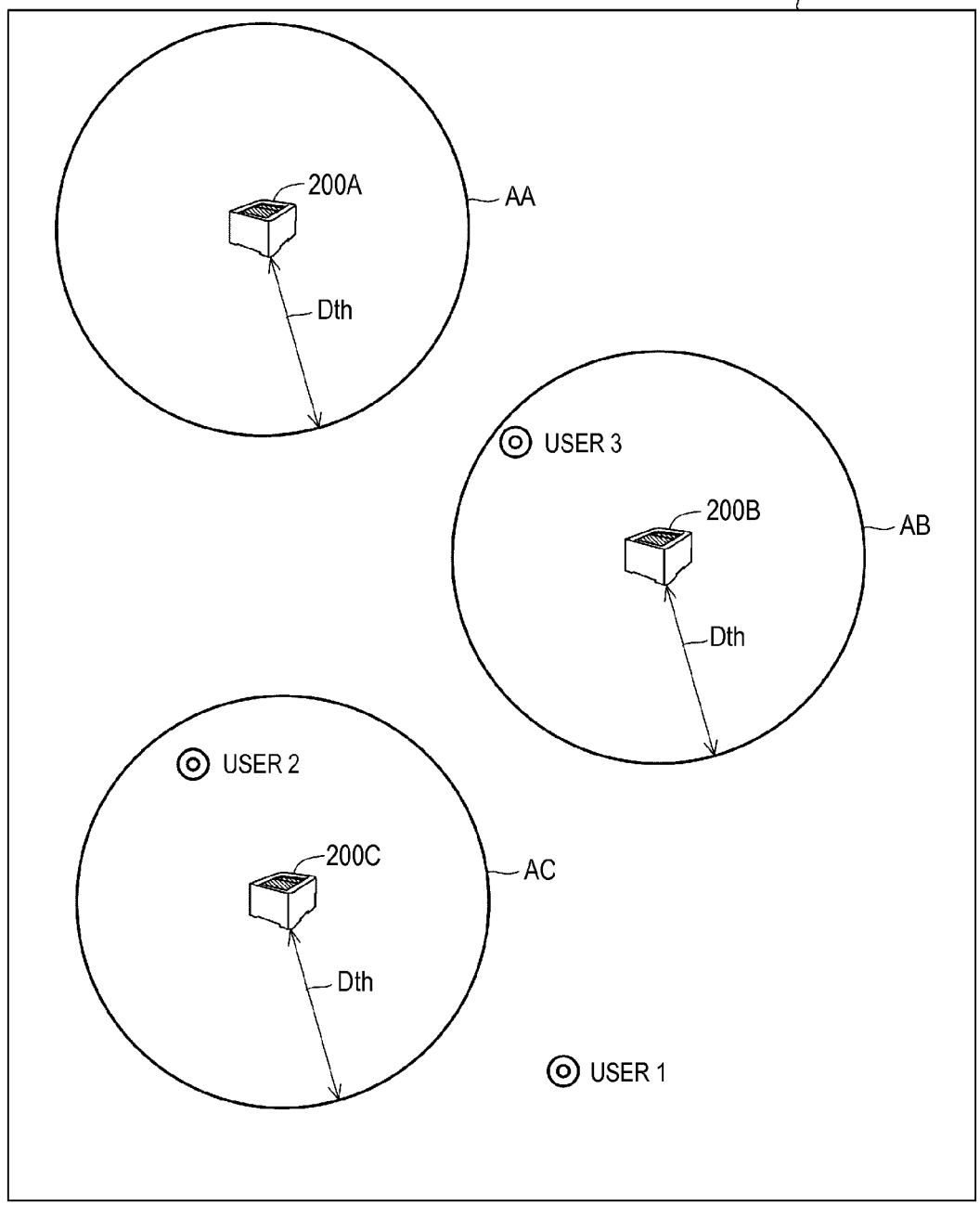

FIG. 3
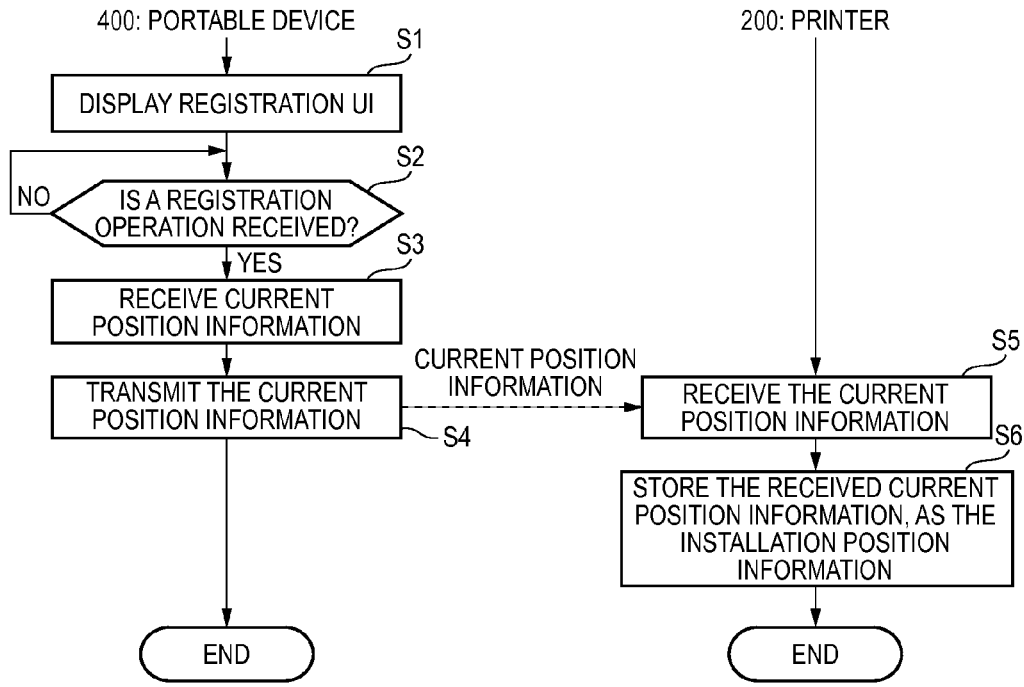
FIG. 4A
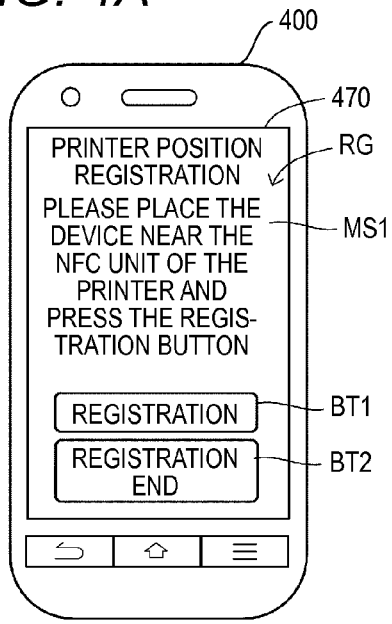
FIG. 4B
| POSITION INFORMATION | SOUTH AND NORTH | NORTH LATITUDE |
| --- | --- | --- |
| | LATITUDE | LT1 |
| | EAST AND WEST | EAST LONGITUDE |
| | LONGITUDE | LG1 |
| | ALTITUDE | HL1 |

FIG. 6

| | | SD |
|---|---|---|
| TERMINAL POSITION INFORMATION | SOUTH AND NORTH | NORTH LATITUDE |
| | LATITUDE | LT2 |
| | EAST AND WEST | EAST LONGITUDE |
| | LONGITUDE | LG2 |
| | ALTITUDE | HL2 |
| CONDITION INFORMATION | COLOR | COLOR |
| | SHEET | A3 |

FIG. 7

| | | PD |
|---|---|---|
| PRINTER POSITION INFORMATION | SOUTH AND NORTH | NORTH LATITUDE |
| | LATITUDE | LT3 |
| | EAST AND WEST | EAST LONGITUDE |
| | LONGITUDE | LG3 |
| | ALTITUDE | HL3 |
| DISTANCE INFORMATION | | D |

FIG. 8

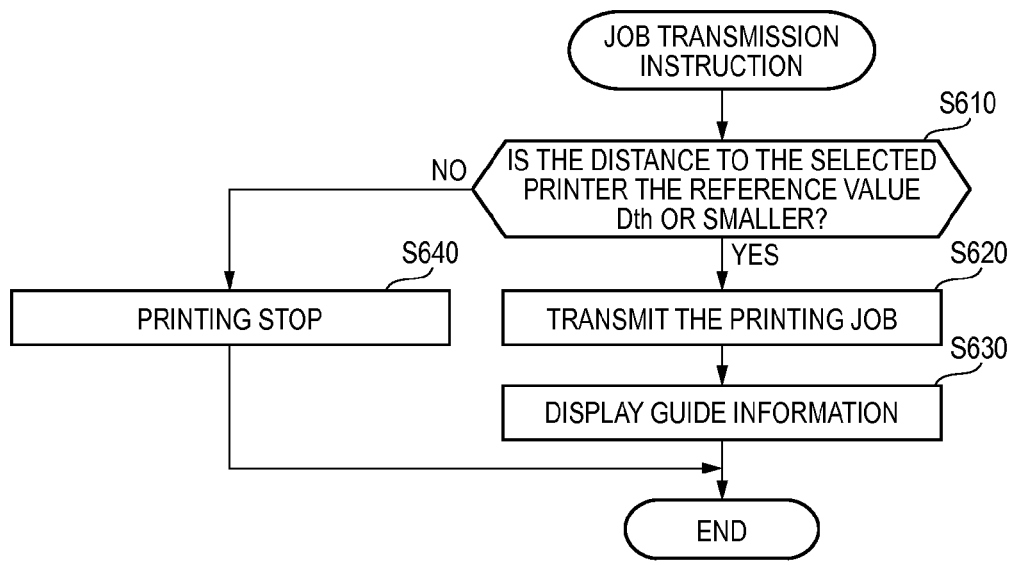

FIRST ILLUSTRATIVE EMBODIMENT

USER 1: PRINTING AT THE PRINTER 200C AFTER MOVING INTO THE AREA AC
USER 2: IMMEDIATE PRINTING AT THE PRINTER 200C
USER 3: IMMEDIATE PRINTING AT THE PRINTER 200B

PRINTER POSITION DETERMINATION AND SELECTION FOR A TERMINAL APPARATUS AND SYSTEM

CROSS-REFERENCE TO RELATED APPLICATIONS

This application claims priority from Japanese Patent Application No. 2013-014867 filed on Jan. 29, 2013, the entire subject matter of which is incorporated herein by reference.

TECHNICAL FIELD

The invention relates to a control of a terminal apparatus, and more particularly, to a technology of controlling a terminal apparatus capable of performing communication with a printer.

BACKGROUND

As a portable device such as a smart phone has been widely spread, and there has been proposed a technology of improving convenience of a user who uses a printer by using the portable device. For example, there has been proposed a technology in which a user transmits service request data including service area information, which indicates a service area in which the user wants a printing processing service, and service content information to a plurality of printers from a portable device. Each of the printers has information of an address of the printer at which the printer is installed and determines whether it is possible to provide the printing processing service suitable for the service request data including the designation of the service area. Among the printers, a printer that can provide the printing processing service suitable for the service request data transmits service provision data, which indicates that the printing processing service can be provided, to the portable device. The portable device displays the service provision data. As a result, the user goes to one of the printers capable of providing the service suitable for the service request data and can receive the printing processing service.

SUMMARY

As described above, a technology of enabling a user to select a suitable printer is required when the multiple printers can be used. Also, according to the above-described related art, the printer has the address information, as the position information indicating a position at which the printer is installed. Thus, a technology of enabling the printer to appropriately store the position information, which indicates the position at which the printer is installed, is required.

Illustrative aspects of the invention provide a novel technology of enabling a user to select a suitable printer when a plurality of printers can be used. Another object of the invention is to provide a novel technology of enabling a printer to appropriately store position information, which indicates a position at which the printer is installed.

The illustrative aspects of the invention can be implemented as following embodiments.

(1) A terminal apparatus comprising: a first position receiving unit configured to receive terminal position information indicating a position of the terminal apparatus; a receiving unit configured to receive a plurality of distance information corresponding to each of printers that are printer candidates to execute a printing, wherein each of the plurality of distance information is generated on the basis of coordinate information, which includes information of a latitude and a longitude indicating a position of the corresponding printer, and the terminal position information; a choosing unit configured to preferentially choose a printer having a short distance to the terminal apparatus from the printers based on the distance information; and a printing instruction unit configured to transmit a printing instruction for printing execution to a specific printer of the one or more chose printers.

According thereto, the choosing unit preferentially chooses a printer having a short distance to the terminal apparatus based on the distance information that is generated on the basis of the printer position information including information of the latitude and longitude indicating a position of the printer and the terminal position information. As a result, when a plurality of printers can be used, it is possible to choose a printer that is suitable for a user.

(2) A terminal apparatus comprising: a first position receiving unit configured to receive terminal position information indicating a position of the terminal apparatus; a receiving unit configured to receive a plurality of distance information corresponding to each of printers that are printer candidates to execute a printing, wherein each of the plurality of distance information is generated on the basis of printer position information indicating a position of the corresponding printer and the terminal position information, and wherein at least one of the distance information and the printer position information is transmitted from each of the printers to the terminal apparatus; a choosing unit configured to preferentially choose a printer having a short distance to the terminal apparatus from the printers based on the distance information; and a printing instruction unit configured to transmit a printing instruction for printing execution to a specific printer of the one or more chose printers.

According thereto, the choosing unit preferentially chooses a printer having a short distance to the terminal apparatus based on the distance information that is generated on the basis of the terminal position information and the printer position information. As a result, when a plurality of printers can be used, it is possible to select a printer that is suitable for a user.

(3) A system comprising a terminal apparatus and a printer. The terminal apparatus comprises: a receiving unit configured to receive terminal position information, which indicates a position of the terminal apparatus, by using a GPS receiver; and a transmission unit configured to transmit the terminal position information to the printer by executing NFC communication. The printer comprises: a reception unit configured to receive the terminal position information from the terminal apparatus by executing the NFC communication; and a storing processing unit configured to store the received terminal position information in a memory, as printer position information indicating a position of the printer.

According thereto, even when the printer does not have a GPS receiver, it is possible to store the printer position information in the printer by using the terminal apparatus.

(4) A terminal apparatus comprising: a receiving unit configured to receive terminal position information, which indicates a position of the terminal apparatus, by using a GPS receiver; and a transmission unit configured to transmit the terminal position information to a printer by executing NFC communication. The transmission unit is configured to transmit the terminal position information to the printer when the terminal apparatus transitions to a state where the terminal apparatus and the printer are able to perform communication by executing the NFC communication, which is a specific mode.

According thereto, even when the printer does not have a GPS receiver, it is possible to store the printer position information in the printer by using the terminal apparatus. Also, since the transmission unit of the terminal apparatus transmits the terminal position information to the printer when the terminal apparatus transitions to a state where the terminal apparatus and the printer can perform communication by executing the NFC communication, the user can easily store the printer position information in the printer.

The invention can be implemented in a variety of forms, for example, a control device of a reading apparatus, a computer program for implementing a function or method of the apparatus, a recording medium having the computer program recorded therein, and the like.

BRIEF DESCRIPTION OF THE DRAWINGS

FIG. 2 shows an example of arrangement of a plurality of printers 200A to 200C;

FIG. 3 is a flow chart of position information registration processing;

FIGS. 4A and 4B illustrate the position information registration processing;

FIG. 6 shows an example of terminal information SD;

FIG. 7 shows an example of printer information PD;

FIG. 8 is a flow chart of job transmission processing of a first illustrative embodiment;

DETAILED DESCRIPTION

Illustrative embodiments of the invention will now be described with reference to the drawings.

A. First Illustrative Embodiment

A-1. Configuration of System

Figure 1A:
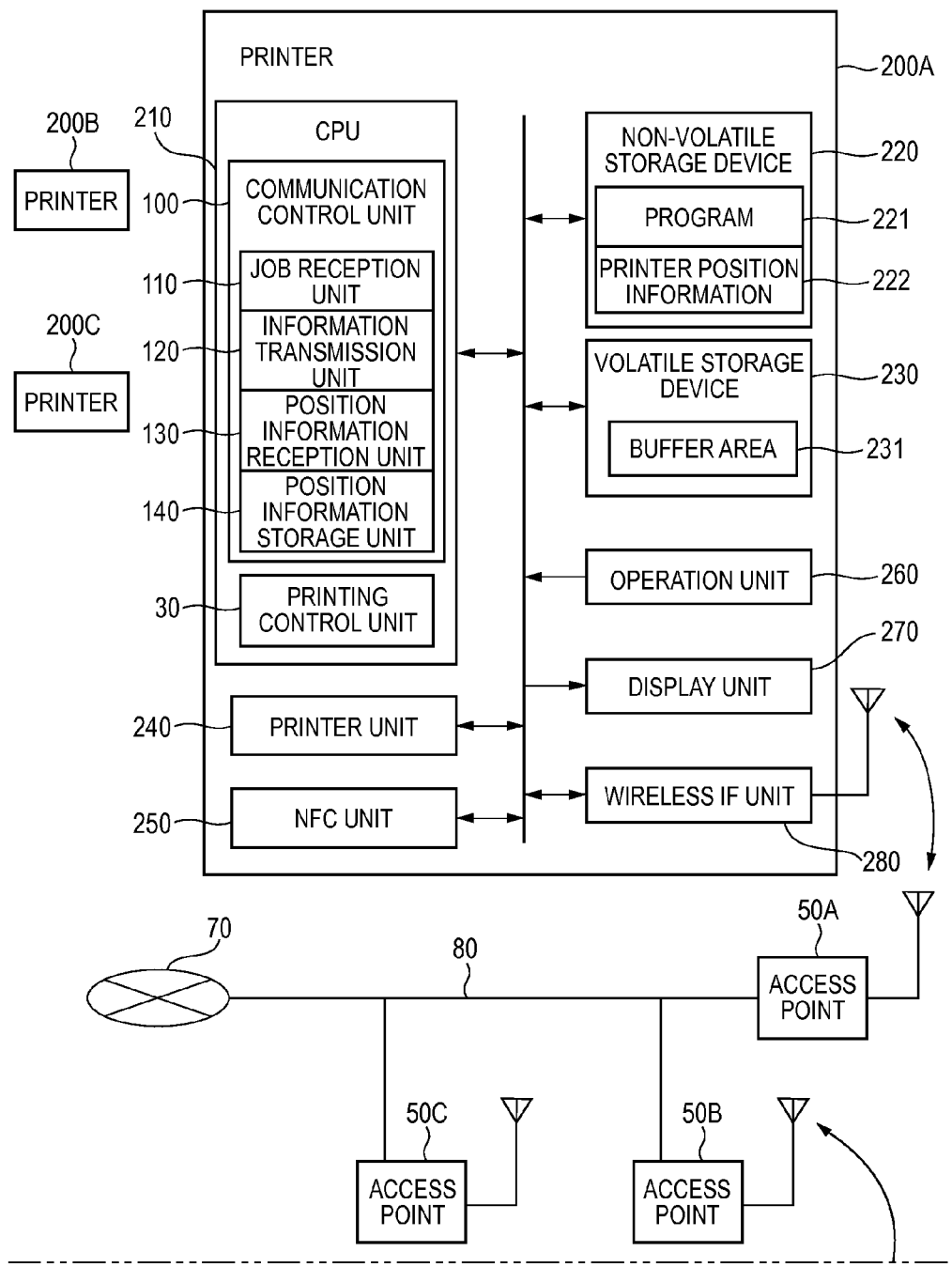
FIGS. 1A and 1B are block diagrams showing a configuration of a system including a portable device 400 that is a terminal apparatus.
Figure 1B:
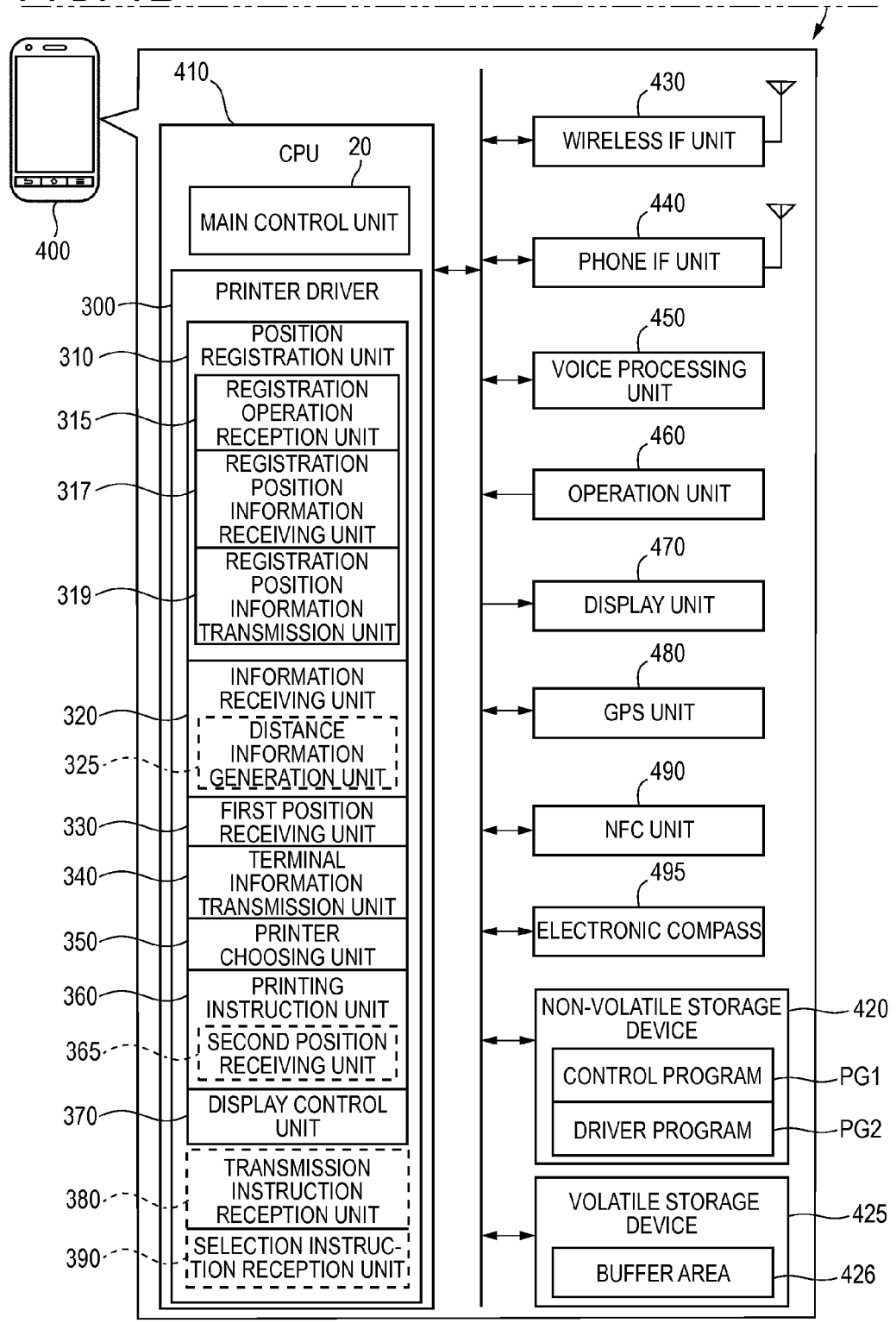

Hereinafter, a first illustrative embodiment of the invention will be described. FIG. 1 is a block diagram showing a configuration of a system including a portable device 400 that is a terminal apparatus. The system includes a plurality of printers 200A to 200C, a local area network (hereinafter referred to as "LAN") 80 that is connected to the Internet 70, a plurality of access points 50A to 50C that is connected to the LAN 80 and the portable device 400.

FIG. 2 shows an example of arrangement of the printers 200A to 200C. As shown in FIG. 2, the printers 200A to 200C are arranged with being dispersed in a relatively large room RM (for example, an office room). A user in the room RM can transmit a printing instruction to any of the printers 200A to 200C by using the portable device 400.

The respective access points 50A to 50C are wireless LAN switches that function as the access points of a wireless LAN using a communication protocol defined by IEEE 802.11a/b/g/n standards and the like. The printers 200A to 200C and the portable device 400 can perform wireless communication using an infrastructure mode through the access points 50A to 50C. The infrastructure mode is a mode with which a plurality of wireless LAN terminal apparatuses performs data communication through the access points. As a result, the printers 200A to 200C and the portable device 400 are treated as network devices that are connected to the LAN 80.

The LAN 80 is a wired network that is established in the room RM of FIG. 2, based on the Ethernet (the registered trademark). The access points 50A to 50C are arranged with being dispersed in the room RM to thereby establish the wireless network (not shown in FIG. 2). As a result, the portable device 400 can connect to the LAN 80 through the wireless network at any place in the room RM.

The printer 200A includes a CPU (an abbreviation of "Central Processing Unit") 210, a non-volatile storage device 220 such as a hard disk drive and a flash memory, a volatile storage device 230 such as a RAM (an abbreviation of "Random Access Memory"), a printer unit 240 that is a print engine printing an image by a predetermined method (for example, inkjet, laser and the like), an NFC unit 250 configured to perform communication with an external device by using NFC (an abbreviation of "Near Field Communication"), an operation unit 260 such as a touch panel and a button, a display unit 270 that includes a display panel such as liquid crystals overlapping with the touch panel and a wireless interface unit (hereinafter refereed to as "wireless IF unit") 280 that functions as an interface for performing data communication with an external apparatus such as a PC (an abbreviation of "Personal Computer") and a portable device.

The volatile storage device 230 is provided with a buffer area 231 that temporarily stores therein a variety of intermediate data, which is generated when the CPU 210 performs processing. The non-volatile storage device 220 stores therein a computer program 221 for controlling the printer 200 and printer position information 222.

The computer program 221 is beforehand stored in the non-volatile storage device 220 upon shipment of the printer 200, for example. Also, the computer program 221 may be provided with being recorded in a CD-ROM or may be downloaded from a server.

The printer position information 222 is coordinate information indicating an installation position of the printer 200 and is stored in the printer 200 by position information registration processing (FIG. 2), as described below.

The CPU 210 executes the computer program 221, thereby entirely controlling the printer 200. Specifically, the CPU 210 functions as a printing control unit 30 for controlling and enabling the printer unit 240 to execute a printing operation and a communication control unit 100 that executes communication processing with the portable device 400. The communication control unit 100 has a job reception unit 110 that receives a printing job from the portable device 400, an information transmission unit 120 that transmits a variety of information to the portable device 400, a position information reception unit 130 that receives terminal position information from the terminal apparatus by using the NFC unit 250 and a position information storage unit 140 that stores the terminal position information received by the position information reception unit 130 in the non-volatile storage device 220, as the printer position information 222. The specific processing that is executed by the respective functional units will be described below.

The wireless IF unit 280 includes an antenna. The wireless IF unit 280 is configured to perform wireless communication through the access points 50A to 50C, i.e., wireless communication based on the infrastructure mode. The wireless IF unit 280 is used for data communication with the portable device 400, for example, as described below. In the below, it is assumed that the data communication (for example, transmission and reception of the printing job) of which a communication method is not particularly mentioned is performed using the wireless communication through the access points 50A to 50C as regards.

Since the other printers 200B, 200C have the same configurations as that of the printer 200A, the descriptions thereof are omitted. When the respective printers 200A to 200C are not distinguishingly described, they are just referred to as the printer 200 with the denoted alphabets thereof being omitted.

The portable device 400 is a multi-functional portable phone that is referred to as a smart phone, for example. The portable device 400 mainly has a CPU 410, a non-volatile storage device 420 such as a hard disk drive and a flash memory, a volatile storage device 425 such as a RAM, a wireless IF unit 430, a phone IF unit 440, a voice processing unit 450 that includes a speaker and a microphone and is provided to implement a phone function and the like, an operation unit 460 including a touch panel, an operation key and the like, a display unit 470 that includes a liquid crystal panel overlapping with the touch panel and the like, a GPS unit 480, an NFC unit 490 and an electronic compass 495. The NFC unit 490 is configured to perform communication with an external device by using the NFC. The electronic compass 495 is configured to detect earth magnetism by using a magnetic sensor and thus recognizes an orientation.

The wireless IF unit 430 includes an antenna. The wireless IF unit 430 is configured to perform wireless communication through the access points 50A to 50C, i.e., wireless communication based on the infrastructure mode. The wireless IF unit 430 is used to transmit a printing job to the printer 200 and to transmit and receive a variety of information to and from the printer 200, for example, as described below.

The phone IF unit 440 includes an antenna. The phone IF unit 440 is configured to perform wireless communication with a base station (not shown), based on a mobile phone communication method (for example, W-CDMA). The phone IF unit 440 is used for access to the Internet 70 through a phone and the base station (not shown), for example.

The GPS unit 480 includes a receiver configured to receive electric waves (GPS signals) transmitted from artificial satellites configuring a GPS (Global Positioning System). The GPS unit 480 can receive position information (coordinate information) indicating a current position (latitude, longitude, altitude), based on the received GPS signals.

The volatile storage device 425 is provided with a buffer area 426 that temporarily stores therein a variety of intermediate data, which is generated when the CPU 410 performs processing.

The non-volatile storage device 420 stores therein a control program PG1 and a printer driver program PG2. The control program PG1 is a program that implements basic functions of the portable device 400 such as a function of OS (Operating System), a phone function, control functions of the GPS unit 480 and the NFC unit 490 and the like. The control program PG1 is provided by a manufacturer of the portable device 400, for example, and is beforehand stored upon the shipment. The printer driver program PG2 is a program that implements a function for remotely controlling the printer unit 240 of the printer 200. The printer driver program PG2 is a program (which is also referred to as 'application') that adds a new function to the portable device 400 and is provided by a provider (for example, a manufacturer of the printer 200) different from the manufacturer of the portable device 400 so that it can be downloaded from a predetermined server. Also, the printer driver program PG2 may be provided by the manufacturer of the portable device 400 or may be beforehand stored upon the shipment.

The CPU 410 executes the control program PG1 to thus function as a main control unit 20 that implements the basic functions of the portable device 400. Also, the CPU 410 executes the printer driver program PG2 to thus function as a printer driver 300. The printer driver 300 has a position registration unit 310, an information receiving unit 320, a first position receiving unit 330, a terminal information transmission unit 340, a printer choosing unit 350, a printing instruction unit 360 and a display control unit 370.

The position registration unit 310 registers the printer position information, which indicates a position of each printer, with each of the printers 200A to 200C prior to a printing instruction. The position registration unit 310 has a registration operation reception unit 315 that receives a predetermined registration operation from a user, a registration position information receiving unit 317 that receives terminal position information, which indicates a terminal position, by using the GPS unit 480 so as to register the same with the printer and a registration position information transmission unit 319 that transmits the received terminal position information to the printer by using the NFC unit 490 so as to register the same with the printer.

The information receiving unit 320, the first position receiving unit 330, the terminal information transmission unit 340 and the printer choosing unit 350 execute processing for determining a specific printer of the printers 200, which is enabled to execute a printing operation. Specifically, the information receiving unit 320 receives distance information corresponding to the respective printers that are printer candidates for executing the printing. The distance information is information indicating a distance between the portable device 400 and the corresponding printer 200, for example. The first position receiving unit 330 receives the terminal position information indicating a position of the portable device 400. The terminal information transmission unit 340 transmits condition information, which indicates a printing condition of a printing instruction that is to be transmitted, to each of the printers. The printer choosing unit 350 preferentially chooses the printers 200 having short distances to the portable device 400.

The printing instruction unit 360 transmits a printing instruction to the specific printer that is enabled to execute the printing. As shown with the broken line of FIG. 1, the printing instruction unit 360 may have a second position receiving unit 365. An example where the second position receiving unit 365 is provided will be described in a second illustrative embodiment.

The display control unit 370 displays, on the display unit, a notification display for notifying a position of the specific printer that is enabled to execute the printing. The notification display includes information (specifically, an arrow image that will be described below) indicating a direction of the position of the specific printer that is enabled to execute the printing, starting from the position of the portable device 400.

Also, as shown with the broken line of FIG. 1, the printer driver 300 may have a transmission instruction reception unit 380 and a selection instruction reception unit 390. An example where the transmission instruction reception unit 380 is provided will be described in a third illustrative embodiment. An example where the selection instruction reception unit 390 is provided will be described in a modified embodiment.

A-2. Operations of System

A-2-1. Registration of Installation Position Information

The position information registration processing of registering the installation position information that is used in printing processing (FIG. 5), which will be described below, with the printers 200 in the system will be described. FIG. 3 is a flow chart of the position information registration processing. The position information registration processing is executed by the position registration unit 310 (FIG. 1) of the portable device 400 and the communication control unit 100 (FIG. 1) of the printer 200. The position information registration processing is executed before the printing processing that will be described below, and starts by a start instruction of a user when the printer 200 is installed. Specifically, the user starts up the printer driver 300 and selects a registration mode that executes the position information registration processing, thereby starting the processing of the portable device 400-side. Also, the user selects a registration mode that executes the position information registration processing through the operation unit 260 of the printer 200, thereby starting the processing of the printer 200-side. In the meantime, the position information registration processing is processing for storing one area information 222 in the one printer 200 and is executed one time for each printer 200 in the system. For example, the position information registration processing may be executed one time after the one printer 200 is installed and is not necessarily executed several times as long as the printer 200 is not moved. For this reason, for example, when there is a plurality of users, one user, for example, a manager of the printer 200 may execute the position information registration processing by using the one portable device 400.

In step S1 of FIG. 3, the position registration unit 310 displays a registration UI image RG on the display unit 470 of the portable device 400.

FIG. 4 illustrates the position information registration processing. In FIG. 4A, an example of the registration UI image RG is shown. The registration UI image RG shown in FIG. 4A includes a message MS1, a registration button BT1 and an ending button BT2. The message MS1 is a message for urging the user to place the portable device 400 near the NFC unit 250 and to press the registration button BT1.

In step S2, the registration operation reception unit 315 determines whether a registration operation of the user, i.e., the registration button BT1 is pressed. When a registration operation is not received (step S2: NO), the registration operation reception unit 315 stands by until a registration operation is received. When a registration operation is received (step S2: YES), i.e., the registration button BT1 is pressed by the user, the registration position information receiving unit 317 of the position registration unit 310 receives current position information LD, which indicates a current position of the portable device 400, by using the GPS unit 480 (step S3). In the meantime, the invention is not limited to the configuration of determining whether a registration operation is received. That is, when the position registration unit 310 detects that the portable device 400 is located in the vicinity of the NFC unit 250 of the printer 200 and thus transitions to a state where the portable device 400 and the printer 200 can perform communication through the NFC method, the registration position information receiving unit 317 of the position registration unit 310 may automatically receive the current position information LD, which indicates a current position of the portable device 400. In this case, the position registration unit 310 may not display the registration button BT1 in the registration UI image RG shown in FIG. 4A. The position registration unit 310 may display, in the registration UI image RG, a message for urging the user to place the portable device 400 near the NFC unit 250 of the printer 200. In general, irrespective of whether the registration operation is received or the position registration unit 310 detects the transition to the communication-possible state, the registration position information receiving unit 317 of the position registration unit 310 may receive the current position information LD, which indicates a current position of the portable device 400, at a state where the portable device 400 and the printer 200 can perform communication by executing the NFC communication.

In FIG. 4B, an example of the current position information LD that is received in step S3 is shown. As shown in FIG. 4B, the current position information is three-dimensional coordinate information including information indicating the latitude (the north latitude or the south latitude), the longitude (the east longitude or the west longitude) and the altitude (the height above the sea), respectively.

At the time at which the processing of step S3 is executed, the portable device 400 is located in the vicinity of the NFC unit 250 of the printer 200, so that the current position information LD received in step S3 indicates the installation position of the printer 200.

In step S4, the registration position information transmission unit 319 of the position registration unit 310 transmits the current position information LD received in step S3 to the printer 200 by the short-distance wireless communication using the NFC unit 490 of the portable device 400. In step S5, the position information reception unit 130 of the printer 200 receives the current position information LD through the NFC unit 250.

In step S6, the position information storage unit 140 of the printer 200 stores the received current position information LD in the non-volatile storage device 220, as the printer position information 222 (FIG. 1) indicating the installation position of the printer 200.

By the above-described position information registration processing, even when the printer 200 is not provided with a GPS receiver, the user can easily register the printer position information 222 with the printer 200. Also, at the state where the portable device 400 is located on the NFC unit 250 of the printer 200, i.e., where the printer 200 and the portable device 400 can perform communication through the NFC communication, the registration position information receiving unit 317 of the position registration unit 310 receives the current position information LD, which is to be stored as the printer position information 222 (step S3). Therefore, it is possible to store the printer position information 222, which correctly indicates the installation position of the printer 200, in the printer 200.

Before the printing processing that will be described below is executed, the position information registration processing is executed for each of the printers 200A to 200C (FIG. 2) and the printer position information 222 is stored in each of the printers 200A to 200C (FIG. 2).

In the meantime, upon the starting of the position information registration processing, the user selects the registration mode that executes the position information registration processing, through the operation unit 260 of the printer 200, thereby starting the processing of the printer 200-side. Instead of this configuration, the processing of the printer-side may start when the current position information is received from the portable device 400 in step S5. In this case, the registration unit 310 of the portable device 400 preferably transmits a command, which requests the registration of the current position information with the printer 200, to the printer 200 together with the current position information, in step S4. By doing so, it is possible to reduce an operation burden of the user.

A-2-2. Printing Processing

Figure 5:
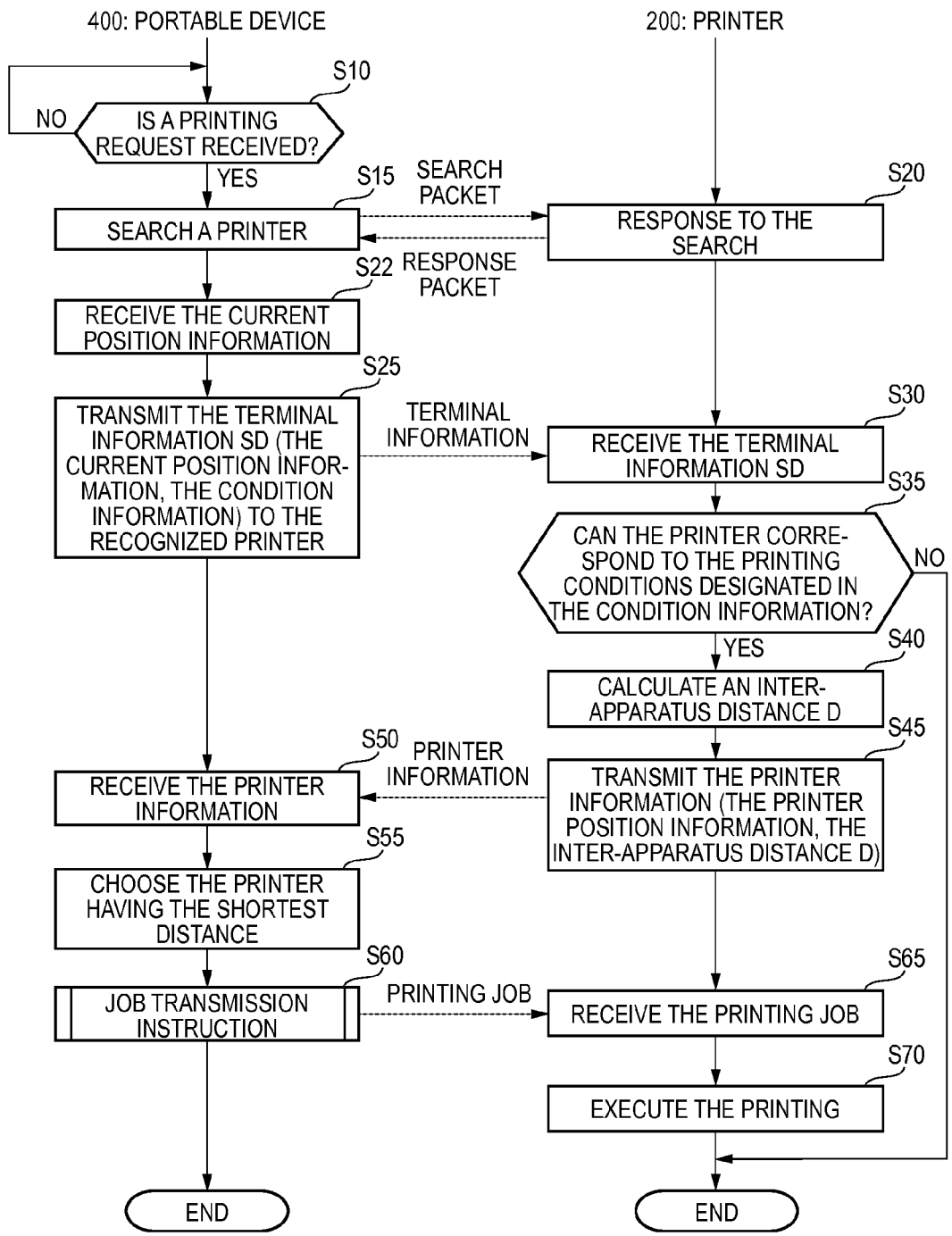
FIG. 5 is a flow chart of printing processing.

FIG. 5 is a flow chart of the printing processing. The printing processing is processing of enabling any one of the printers 200A to 200C (FIG. 3) to execute the printing by using the printer driver 300 of the portable device 400. The printing processing is executed when the user starts up the printer driver 300 of the portable device 400 so as to execute the printing processing.

When the printer driver 300 starts, it displays a predetermined UI image (not shown) on the display unit 470 of the portable device 400 and receives a printing request from the user. The printing request includes a designation of image data (for example, document data, figure data and the like) to be printed and a designation of printing conditions (for example, color or monochrome, a sheet size and the like).

In step S10 of FIG. 5, the printer driver 300 determines whether a printing request is received from the user. When a printing request is not received (step S10: NO), the printer driver 300 stands by until a printing request is received. When a printing request is received (step S10: YES), the printer driver 300 searches for the printer 200 that is to be a transmission destination candidate of a printing job, i.e., a printer candidate to perform the printing (step S15). Specifically, the printer driver 300 broadcasts a search packet on the LAN 80 through the wireless communication. As a result, the search packet is transmitted to all the printers 200 wiredly or wirelessly connected to the LAN 80, the three printers 200A to 200C in the example of FIG. 2.

In step S20, the communication control unit 100 of the printer 200 having received the search packet transmits a response packet including an IP address of the printer 200 to the portable device 400 that is a transmission source of the search packet. By receiving the response packet, the printer driver 300 can recognize that the printer 200 to be a transmission destination candidate exists and receive the IP address for accessing the printer 200. In the example of FIG. 2, since the response packet is transmitted to the portable device 400 from each of the printers 200A to 200C, the three printers 200A to 200C are recognized.

In step S22, the first position receiving unit 330 of the printer driver 300 receives the current position information, which indicates the current position of the portable device 400, by using the GPS unit 480. Here, the current position information to be received is three-dimensional coordinate information including the information indicating the latitude (the north latitude or the south latitude), the longitude (the east longitude or the west longitude) and the altitude (the height above the sea), respectively, like the current position information LD shown in FIG. 4B.

In step S25, the terminal information transmission unit 340 of the printer driver 300 transmits terminal information SD to the printer 200 searched in step S15, in the example of FIG. 2, to each of the three printers 200A to 200C.

FIG. 6 shows an example of the terminal information SD. As shown in FIG. 6, the terminal information SD includes the current position information, which is received in step S22, and condition information indicating the printing conditions designated in the printing request received in step S10. In the example of FIG. 6, the terminal information SD includes, as the condition information, the color-related information, i.e., the information designating whether the printing is color or monochrome printing and the information designating the sheet size.

In step S30, the communication control unit 100 of the printer 200 receives the terminal information SD from the portable device 400. In the example of FIG. 2, the communication control unit 100 of each of the three printers 200A to 200C receives the terminal information SD.

In step S35, the communication control unit 100 determines whether the printer can correspond to the printing conditions designated in the condition information included in the terminal information SD. Here, it may be possible to determine whether the printer can correspond to the printing conditions by determining whether the specification of the printer 200 can execute the printing meeting the printing conditions. In addition to the specification of the printer 200, it may be possible to determine whether the printer can correspond to the printing conditions by determining whether it is possible to execute the printing, based on the printing conditions, at the present moment, considering situations of the disposables (whether there is the ink, whether there is the sheet and the like). For example, when the specification of the printer 200 corresponds to the A3 size, the communication control unit 100 may determine that the printer can correspond to the printing of the A3 size. Also, when the specification of the printer 200 corresponds to the A3 size and the sheet of the A3 size is set on a sheet tray, the communication control unit 100 may determine that the printer can correspond to the printing of the A3 size. When the condition information includes a plurality of the printing conditions (for example, the color-related condition, the sheet size-related condition and the like), the communication control unit 100 determines that the printing meeting the printing conditions can be executed, if the printer can correspond to all the printing conditions.

When it is determined that the printer can correspond to the printing conditions (step S35: YES), the communication control unit 100 calculates a distance (which is also referred to as an inter-apparatus distance D) between the portable device 400, which is the transmission source of the terminal information SD, and the printer 200 having received the terminal information SD (step S40). Specifically, the communication control unit 100 calculates the inter-apparatus distance D, based on the position of the portable device 400 indicated by the current position information received in step S30 and the position of the printer 200 indicated by the printer position information 222 (FIG. 1) stored in the printer 200. Specifically, the communication control unit 100 calculates the inter-apparatus distance D, based on the three-dimensional coordinate values (the latitude value, the longitude value and the altitude value=LT1, LG1, HL1) included in the current position information of the portable device and the three-dimensional coordinate values (the latitude value, the longitude value and the altitude value=LT1, LG1, HL1) included in the printer position information. More specifically, the communication control unit 100 calculates a horizontal distance, i.e., a distance based on the latitude value and the longitude value by using a well-known formula, specifically, Hubeny's formula or Lambert-Andoyer's formula. When considering a vertical distance, the communication control unit 100 calculates a vertical distance, based on a difference of the height values above the sea ($\Delta HL = HL1 - HL2$). The communication control unit 100 calculates the inter-apparatus distance D by the Pythagorean theorem, based on the horizontal distance and the vertical distance.

In step S45, the information transmission unit 120 of the communication control unit 100 transmits printer information PD to the portable device 400 that is the transmission source of the terminal information SD.

FIG. 7 shows an example of the printer information PD. As shown in FIG. 7, the printer information PD includes the position information, which indicates the position of the printer 200, i.e., the printer position information 222 and the distance information, which indicates the inter-apparatus distance D calculated in step S40.

On the other hand, when it is determined that the printer cannot correspond to the printing conditions (step S35: NO), the communication control unit 100 ends the processing without transmitting the printer information PD to the portable device 400. That is, although the printer of the printers in the system, which can correspond to the printing conditions, transmits the printer information PD to the portable device 400, the printer that cannot correspond to the printing conditions does not transmit the printer information PD to the portable device 400. In the example of FIG. 2, it is assumed that all the printers 200A to 200C correspond to the printing conditions (step S35: YES) and transmit the printer information PD to the portable device 400 (step S45).

In step S50, the information receiving unit 320 of the printer driver 300 receives the printer information PD. In step S55, the printer choosing unit 350 chooses one printer 200 that is closest to the portable device 400. Specifically, when the number of the printer information PD received in step S50 is one, the printer choosing unit 350 chooses the printer 200 that is the transmission source of the corresponding printer information PD. When the number of the printer information PD received in step S50 is plural, the printer choosing unit 350 chooses the printer 200 that is the transmission source of the printer information including the minimum inter-apparatus distance D.

As described above, since the printer information PD is transmitted from only the printer 200 that can correspond to the designated printing conditions, the one printer 200, which is closest to the portable device 400, of the printers 200 corresponding to the printing conditions designated in the printing request, is chose.

For example, when a holder of the portable device 400 is a user 1 of FIG. 1, the printer 200C of the three printers 200A to 200C is chose. Also, when the holder of the portable device 400 is a user 2, the printer 200C is chose, and when the holder of the portable device 400 is a user 3, the printer 200B is chose.

In step S60, the printer driver 300 executes job transmission processing (which will be described later) for transmitting a printing job to the one printer 200 chose in step S55. The printing job includes printing image data, which indicates a printing image, and the condition information, which designates the printing conditions. The printing job is an example of the printing instruction that instructs the printer 200, which is the transmission destination, to execute the printing on the basis of the printing image data. In step S65, the job reception unit 110 of the one printer 200 chose in step S55 receives the printing job. In step S70, the printing control unit 30 of the printer 200 having received the printing job executes the printing, based on the printing job. When the printing is executed, the printing processing is over.

According to the printing processing described above, the printer choosing unit 350 chooses the printer 200 that is closest to the portable device, based on the printer information PD, which is generated on the basis of the printer position information including the latitude and the longitude, which indicate the position of the printer, and the terminal position information, as the transmission destination printer of the printing instruction. As a result, the printer that is suitable for the user can be chose from the useable printers 200A to 200C, as the transmission destination printer of the printing instruction. For example, the user can conveniently use the printer because it is possible to enable the printer, from which the user can easily collect the printed sheet, to execute the printing. Also, since it is possible to shorten the time, which is necessary to collect the printed sheet, it is possible to suppress the printed sheet from being stolen and from being seen to a third party other than an authorized person, thereby improving the security.

Also, the printer information PD is generated by the communication control unit 100 of the printer 200 by using the current position information transmitted to each printer 200 from the portable device 400 and is then transmitted to the portable device 400. That is, the terminal information transmission unit 340 transmits the current position information, which indicates the current position of the portable device 400, to each of the printers 200A to 200C (FIG. 5: step S25). Then, the information receiving unit 320 receives the printer information PD, which is generated based on the printer position information 222 (FIG. 1) stored in each of the printers 200A to 200C and the current position information, from each of the printers 200A to 200C (FIG. 5: step S50). As a result, the portable device 400 does not need to store therein the information of the installation position of the useable printer 200. Also, the portable device 400 may have only to transmit the terminal information SD (FIG. 6) including the current position information to each printer 200. As a result, it is possible to save a resource (memory or calculation ability) of the portable device 400. Also, since it is not necessary to provide a server for managing the system including the printers 200, it is possible to establish the simple and useful system.

Also, the terminal information transmission unit 340 transmits the condition information, which indicates the printing conditions of the printing instruction, to each of the printers 200A to 200C (FIG. 5: step S25). Then, the information transmission unit 120 of the printer 200 transmits the printer information PD to the portable device 400 when the printer can correspond to the printing conditions. Hence, the information receiving unit 320 receives the printer information PD from only the printer, which can execute the printing in accordance with the printing conditions, of the printers 200A to 200C. Thus, it is possible to appropriately choose the printer, to which the printing instruction is to be transmitted, from the printers that can execute the printing in accordance with the printing conditions.

A-2-3. Job Transmission Processing

The job transmission processing of step S60 of FIG. 5 will be described. FIG. 8 is a flow chart of the job transmission processing of the first illustrative embodiment. The job transmission processing is executed by the printing instruction unit 360 and the display control unit 370.

In step S610, the printing instruction unit 360 determines whether the distance between the specific printer chose in step S55 of FIG. 5 (hereinafter, simply referred to as the specific printer) and the portable device 400 is a reference value Dth or smaller. That is, the printing instruction unit 360 determines whether the inter-apparatus distance D indicated by the distance information included in the printer information PD of the specific printer is the reference value Dth or smaller. The data indicating the reference value Dth is beforehand stored in the printer driver program PG2.

When the distance between the specific printer and the portable device 400 is the reference value Dth or smaller (step S610: YES), the printing instruction unit 360 transmits a printing job to the specific printer (step S620). When the printing job is transmitted, the processing of steps S65, S75 of FIG. 5 is executed, so that the printing is executed.

In step S630, the display control unit 370 displays a position notification image PI for notifying the position of the specific printer, i.e., the position of the printer 200, which is the transmission destination of the printing job, on the display unit 470.

Figure 9:
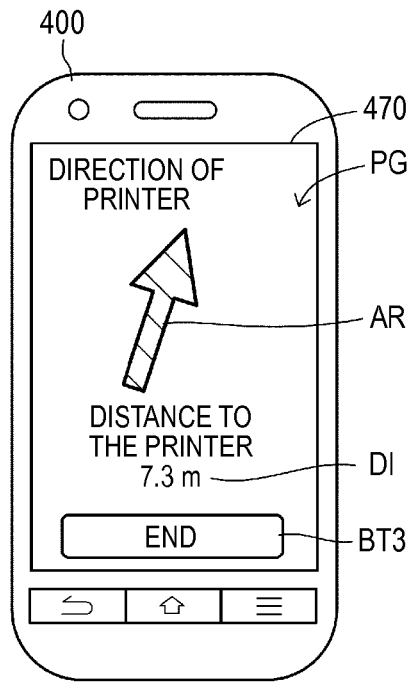
FIG. 9 shows an example of a position notification image PI of the first illustrative embodiment.

FIG. 9 shows an example of the position notification image PI of the first illustrative embodiment. The position notification image PI of FIG. 9 includes an arrow image AR, a distance display DI and an ending button BT3. The arrow image AR indicates a direction of the position of the specific printer (hereinafter, simply referred to as the direction of the specific printer), starting from the position of the portable device 400. The distance display DI indicates a distance from the portable device 400 to the specific printer.

More specifically, the display control unit 370 specifies the direction of the specific printer towards the portable device 400 and the distance to the specific printer by using the printer position information (FIG. 7) included in the printer information PD received from the specific printer in step S50 of FIG. 5 and the terminal position information received in step S22. The display control unit 370 further receives an orientation of the portable device 400 by using the electronic compass 495, for example an orientation towards which an extension direction from a lower end-side of the portable device 400 to an upper end-side is directed along a line connecting a center of a lower end portion of the portable device 400 and a center of an upper end portion. The display control unit 370 specifies the direction of the specific printer with respect to the orientation of the portable device 400 and displays the arrow image AR directed towards the specified direction on the display unit 470. Also, the printing control unit 30 displays the distance display DI, which indicates the distance to the specific printer by a digit, on the display unit 470. The display control unit 370 receives the orientation of the portable device 400 and the current position information of the portable device 400 at a predetermined interval (for example, 100 milliseconds) and updates the arrow image AR and the distance display DI. As a result, the user of the portable device 400 can appropriately recognize the position of the specific printer, i.e., the printer 200 from which the document based on the printing instruction is output by seeing the position notification image PI. Then, the user can easily reach the position of the specific printer in accordance with the guidance of the position notification image PI.

When the ending button BT3 is pressed by the user, the display control unit 370 ends the display of the position notification image PI. The user may press the ending button BT3 when the user reaches the specific printer, for example.

When the distance between the specific printer and the portable device 400 is larger than the reference value Dth (step S610: NO), the printing instruction unit 360 stops the printing and ends the job transmission instruction. As a result, the processing of steps S65, S75 of FIG. 5 is not executed and the printing processing is over. Hence, in this case, the printing is not executed.

According to the job transmission instruction described above, the printing instruction unit 360 transmits the printing instruction to the specific printer when the distance between the portable device 400 and the specific printer is within the reference value Dth (step S620) and does not transmit the printing instruction to the specific printer when the distance between the portable device 400 and the specific printer is larger the reference value Dth (step S640). As a result, it is possible to suppress the printing from being executed in the printer that is excessively distant from the terminal apparatus.

The reason is because the printer 200 more distant from the portable device 400 than the reference value Dth is disabled from executing the printing, considering the security. A magnitude of the reference value Dth is preferably set depending on the intended security level. When the reference value Dth is made to be smaller, it is possible to increase the security level. The reference value Dth is set to be 5 to 30 meters, for example.

For example, when the holder of the portable device 400 is the user 1 of FIG. 2, the distance between the printer 200C selected in step S55 of FIG. 5 and the user 1 is larger than the reference value Dth, so that the printing is stopped. When the holder of the portable device 400 is the user 2, the distance between the printer 200C selected in step S55 of FIG. 5 and the user 2 is the reference value Dth or smaller. Thus, the printing instruction is transmitted to the printer 200C, so that the printing is executed in the printer 200C. When the holder of the portable device 400 is the user 3, the printing instruction is transmitted to the printer 200B, so that the printing is executed in the printer 200B.

B. Second Illustrative Embodiment

In a second illustrative embodiment, the printing instruction unit 360 has the second position receiving unit 365 shown with the broken line in FIG. 1. The other configurations of the second illustrative embodiment are the same as the first illustrative embodiment. The printing processing of the second illustrative embodiment is different from the printing processing of the first illustrative embodiment, as regards the job transmission processing of the step S60 of FIG. 5. The other processing is the same as the first illustrative embodiment.

Figure 10:
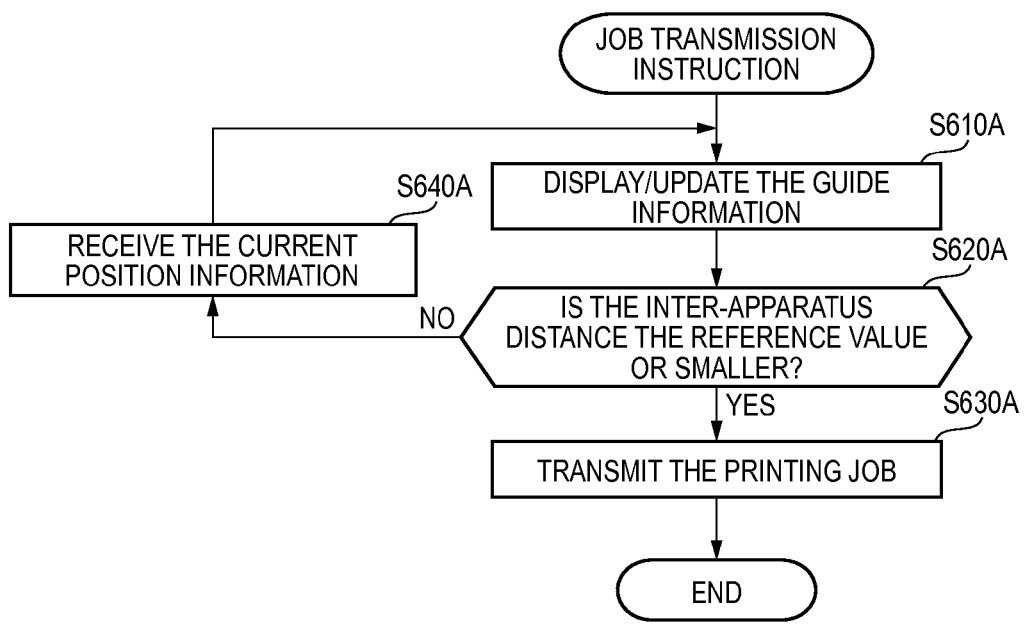
FIG. 10 is a flow chart of the job transmission processing of a second illustrative embodiment.

FIG. 10 is a flow chart of the job transmission processing of the second illustrative embodiment. In step S610A, the display control unit 370 displays a position notification image PI (FIG. 9) for notifying the position of the specific printer on the display unit 470, like step S630 of FIG. 8.

In step S620A, the printing instruction unit 360 determines whether the distance between the specific printer and the portable device 400 is the reference value Dth or smaller, like step S610 of FIG. 8. When the distance between the specific printer and the portable device 400 is the reference value Dth or smaller (step S620A: YES), the printing instruction unit 360 transmits the printing job to the specific printer (step S630A). When the printing job is transmitted, the processing of steps S65, S75 of FIG. 5 is executed, so that the printing is executed. After the transmission of the printing job, the display control unit 370 may display the position notification image PI (FIG. 9) on the display unit 470, like the first illustrative embodiment.

When the distance between the specific printer and the portable device 400 is larger than the reference value Dth (step S620A: NO), the printing instruction unit 360 does not transmit the printing job but shifts to step S640A with deferring the transmission of the printing job without stopping the printing.

In step S640A, the second position receiving unit 365 of the printing instruction unit 360 receives the current position information of the portable device 400 by using the GPS unit 480. When the current position information is received, the processing returns to step S610A and the display control unit 370 updates the position notification image PI (FIG. 9). As a result, the position notification image PI is updated until the distance to the portable device 400 becomes the reference value Dth or smaller. Then, when the distance between the specific printer and the portable device 400 becomes the reference value Dth or smaller (step S620A: YES), the printing instruction unit 360 transmits the printing job to the specific printer (step S630A), as described above.

Figure 11:
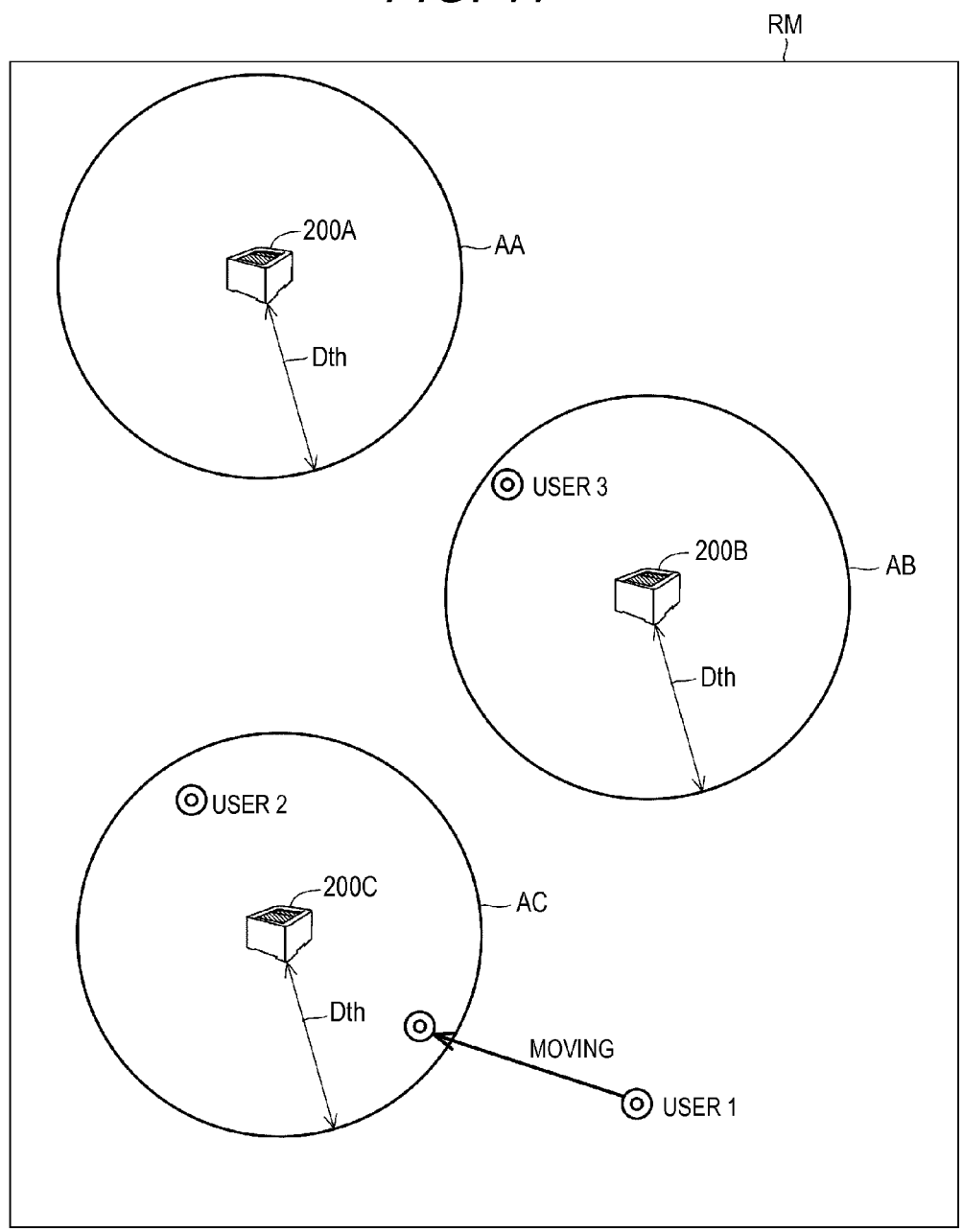
FIG. 11 illustrates the job transmission processing of the second illustrative embodiment.

FIG. 11 illustrates the job transmission processing of the second illustrative embodiment. In FIG. 11, the printers 200A to 200C that are arranged in the same manner as the first illustrative embodiment are shown. According to the second illustrative embodiment, when the holder of the portable device 400 is the user 1 of FIG. 11, the printing instruction is not transmitted while the user 1 is at a position more distant from the printer 200C than the reference value Dth. After that, when the user 1 moves to a range of the reference value Dth or smaller from the printer 200C, the printing instruction is transmitted. When the holder of the portable device 400 is the user 2 or the user 3, the printing instruction is immediately transmitted to the printer 200C and the printer 200B, like the first illustrative embodiment.

According to the job transmission processing of the second illustrative embodiment described above, when the printing instruction is not transmitted to the specific printer because the distance between the portable device 400 and the specific printer is larger than the reference value Dth, the printing instruction unit 360 transmits the printing instruction to the specific printer at the time at which the distance between the portable device 400 and the specific printer is within the reference value as the portable device 400 is moved. As a result, it is possible to execute the printing at appropriate timing as the user moves.

C. Third Illustrative Embodiment

In a third illustrative embodiment, the printing instruction unit 360 has the transmission instruction reception unit 380 shown with the broken line in FIG. 1. The other configurations of the third illustrative embodiment are the same as the first illustrative embodiment. The printing processing of the third illustrative embodiment is different from the printing processing of the first illustrative embodiment, as regards the job transmission processing of the step S60 of FIG. 5. The other processing is the same as the first illustrative embodiment.

Figure 12:
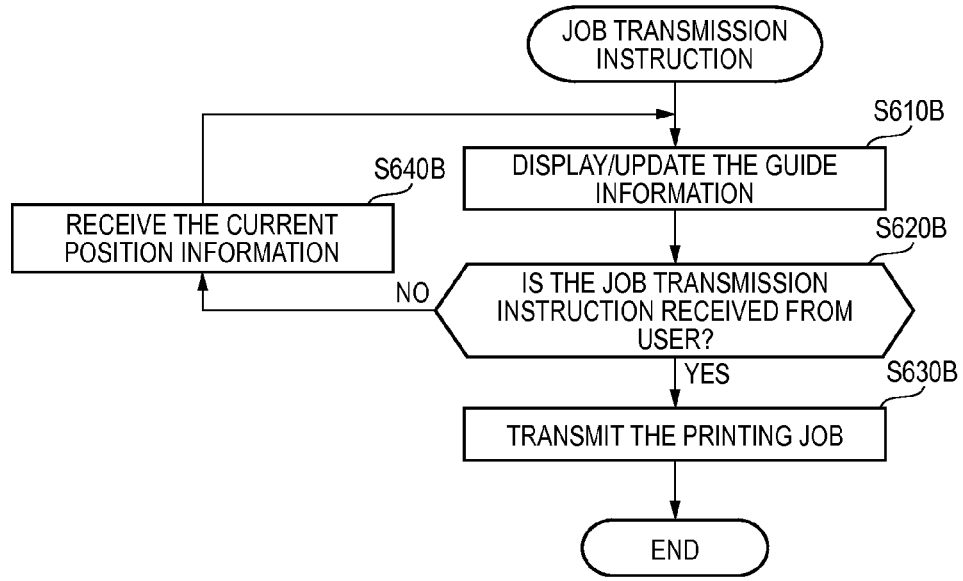
FIG. 12 is a flow chart of the job transmission processing of a third illustrative embodiment.

FIG. 12 is a flow chart of the job transmission processing of the third illustrative embodiment. In step S610B, the display control unit 370 displays a position notification image PIA for notifying a position of the specific printer on the display unit 470.

Figure 13:
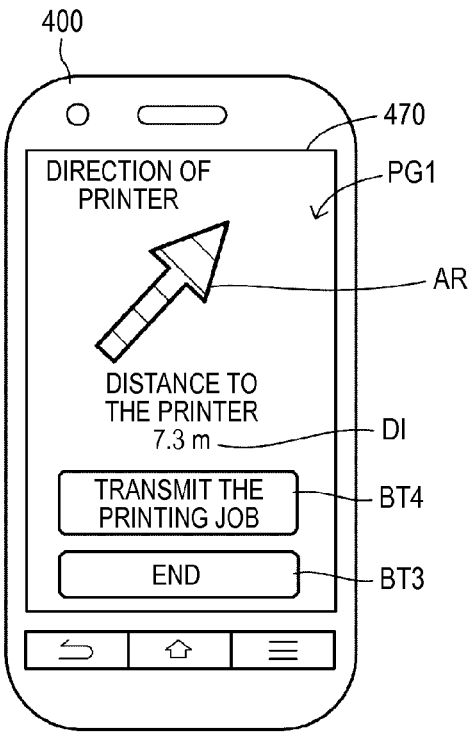
FIG. 13 shows an example of a position notification image PI1 of the third illustrative embodiment.

FIG. 13 shows an example of a position notification image PI1 of the third illustrative embodiment. The position notification image PIA of FIG. 13 includes the arrow image AR, the distance display DI and the ending button BT3, like the position notification image PI of FIG. 9. The position notification image PIA of FIG. 13 further includes an instruction receiving button BT4 for receiving an instruction (hereinafter, referred to as a job transmission instruction), which instructs the transmission of the printing job to the specific printer, from the user. The transmission instruction reception unit 380 receives the job transmission instruction from the user through the instruction receiving button BT4.

In step S620B, the transmission instruction reception unit 380 determines whether a job transmission instruction is received. When a job transmission instruction is not received (step S620A: NO), the printing instruction unit 360 defers the transmission of the printing job until a job transmission instruction is received. When a job transmission instruction is received (step S620A: YES), the printing instruction unit 360 transmits the printing job to the specific printer (step S630B). When the printing job is transmitted, the processing of steps S65, S75 of FIG. 5, so that the printing is executed. After the transmission of the printing job, the display control unit 370 may display the position notification image PI (FIG. 9) on the display unit 470, like the first illustrative embodiment.

According to the job transmission processing of the third illustrative embodiment described above, when the transmission instruction is received from the user after the specific printer is determined, the printing instruction is transmitted. That is, when the instruction of enabling the specific printer, which is chose by the printer choosing unit 350, to execute the printing is received, the printing instruction is transmitted. Therefore, it is possible to suppress the printing instruction from being transmitted to the printer 200 that is not suitable for the user. Also, since the user determines the transmission timing of the printing instruction, it is possible to execute the printing at the user-intended timing. Also, since the job transmission instruction is received through the instruction receiving button BT4 included in the position notification image PH (FIG. 13), the user can enable the printer 200 to execute the printing at appropriate timing after recognizing the position of the printer 200 executing the printing. For example, in case that a document to be printed has no confidentiality, the user gives priority to rapid completion of the printing and can enable the printer 200 to execute the printing when the user is at a position relatively distant from the printer 200 to execute the printing. On the other hand, in case that a document to be printed has the confidentiality, the user can enable the printer 200 to execute the printing after the user sufficiently approaches the printer to execute the printing.

D. Modified Embodiments (1) In the first illustrative embodiment, the printer choosing unit 350 chooses the printer having the shortest inter-apparatus distance D from the printers 200A to 200C. Instead of this configuration, the printer choosing unit 350 may consider a condition other than the inter-apparatus distance D. For example, when the number of sheets to be printed is large, the printer having the shortest inter-apparatus distance D may be chose from the printers having a printing speed of a reference value or larger, considering the printing speed. Alternatively, considering whether the other printing job is being processed or not, the printer having no printing job being processed or the printer having the smallest number of printing jobs being processed may be chose from the printers having the inter-apparatus distance D of a specific reference value or smaller. The printer driver 300 of the portable device 400 may receive the information about the printing speed or printing job being processed by inquiring of the respective printers 200 about the same. In general, the printer choosing unit 350 may preferentially choose the printer close to the portable device 400 from the printers 200A to 200C.

Figure 14:
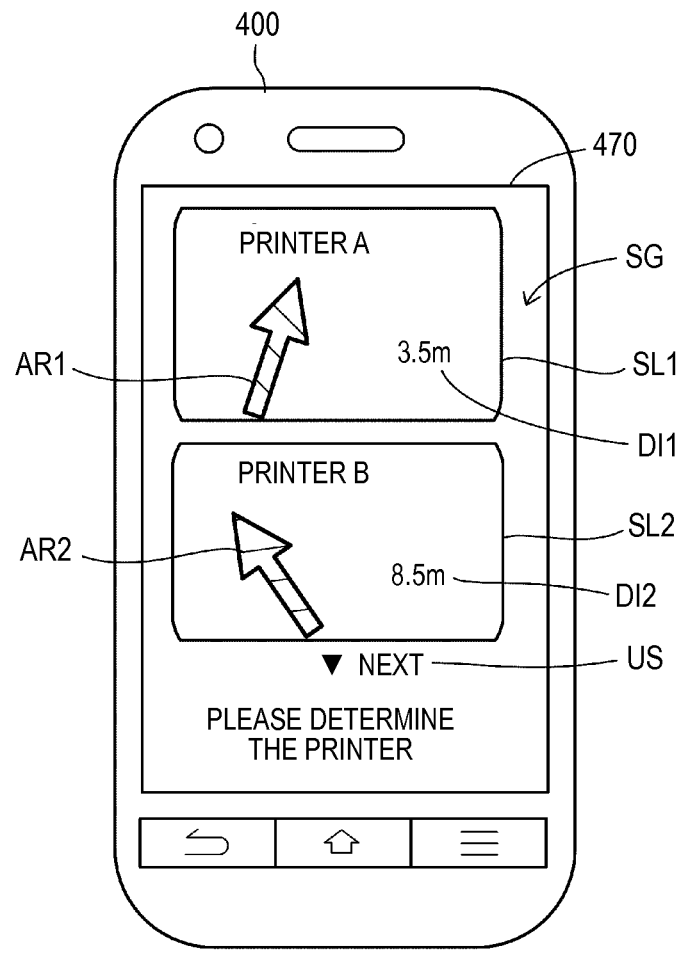
FIG. 14 shows an example of a list display image SG.

(2) The printer choosing unit 350 may choose one or more printers having the distance to the portable device 400 shorter than the reference value from the printers 200A to 200C so as to generate a list in which the printers 200A to 200C are arranged in order of the short inter-apparatus distance D. The selection instruction reception unit 390 of FIG. 1 prepares a list, based on the choosing result. The prepared list is displayed on the display unit 470 so that the user selects one specific printer from the one or more chose printers, for example. FIG. 14 shows an example of a list display image SG. The list display image SG includes a plurality of selection items SL1, SL2 corresponding to the plurality of printers. In the example of FIG. 14, the selection items SL1, SL2 include names of the corresponding printers and the information indicating positions of the corresponding printers, i.e., arrow images AR1, AR2 indicating the directions of the corresponding printers and information DI1, DI2 indicating the distances to the corresponding printers.

The selection instruction reception unit 390 of FIG. 1 receives a selection instruction, which selects, as the specific printer, one printer from the printers in the list through the list display image SG, from the user. The printing instruction unit 360 may transmit the printing instruction to the specific printer selected by the selection instruction from the user. In this way, the user can conveniently use the printer because it is possible to easily select the printer, which is to execute the printing, from the printers having the relatively short distances to the portable device 400.

(3) In the printing processing of FIG. 5, the terminal information transmission unit 340 of the printer driver 300 transmits the terminal information SD including the current position information of the portable device 400 to the printer 200 (step S25 in FIG. 5) and the communication control unit 100 of the printer 200 calculates the inter-apparatus distance D (step S40 in FIG. 5). The information receiving unit 320 of the printer driver 300 receives the printer information PD including the inter-apparatus distance D from the printer 200 (step S50 in FIG. 5). Instead of this configuration, the information receiving unit 320 may receive the inter-apparatus distance D as the printer information by calculating the inter-apparatus distance D. That is, as shown with the broken line in FIG. 1, the information receiving unit 320 of the portable device 400 may have a distance information generation unit 325 that generates the distance information indicating the inter-apparatus distance D by calculation, based on the printer position information received from each of the printers 200 and the terminal position information.

Specifically, in step S25 of FIG. 5, the terminal information transmission unit 340 transmits only the condition information to the respective printers 200A to 200C without transmitting the current position information of the portable device 400. The communication control unit 100 of each of the printers 200A to 200C does not execute the calculation processing of the inter-apparatus distance D (step S40 of FIG. 5) even when the printer can correspond to the printing conditions designated by the condition information. In step S45, the information transmission unit 120 transmits only the printer position information 222 to the portable device 400. Then, in step S55, the information receiving unit 320 calculates the inter-apparatus distances D to the respective printers 200A to 200C, based on the printer position information 222 of the respective printers 200A to 200C and the current position information of the portable device 400. Then, the printer choosing unit 350 has only to choose the printer having the shortest inter-apparatus distance D from the respective printers 200A to 200C.

(4) In the printing processing of FIG. 5, the terminal information transmission unit 340 of the printer driver 300 transmits the terminal information SD including the condition information indicating the printing conditions to the printer 200 (step S25 in FIG. 5), and when the printer can correspond to the printing conditions designated by the condition information (step S35 of FIG. 5: YES), the information transmission unit 120 of the printer 200 transmits the printer information PD to the portable device 400. That is, the printer 200 determines whether it is possible to correspond to the printing conditions. Instead of this configuration, the printer driver 300 of the portable device 400 may determine whether it is possible to correspond to the printing conditions.

Specifically, in step S25 of FIG. 5, the terminal information transmission unit 340 transmits only the current position information of the portable device 400 to the respective printers 200A to 200C without transmitting the condition information. The communication control unit 100 of each of the respective printers 200A to 200C transmits the printer information PD including the information, which indicates the printing conditions to which the printer can correspond, to the portable device 400 together with the inter-apparatus distance D and the printer position information in step S45 of FIG. 5, without determining whether it is possible to correspond to the printing conditions. Then, in step S55 of FIG. 5, the printer choosing unit 350 has only to choose the printer having the shortest inter-apparatus distance D from the printers that can correspond to the printing conditions of the printing job.

(5) In the position registration processing of FIG. 3, the position registration unit 310 transmits the current position information LD to the printer 200 by using the NFC. Instead of this configuration, the position registration unit 310 may transmit the current position information LD to the printer 200 by using the other communication means. As the other communication means, the wireless communication based on the Wi-Fi standards, specifically, the wireless communication (the infrastructure mode) using the access points 50A to 50C (FIG. 1), the wireless communication using the ad-hoc mode, Bluetooth (the registered trademark), the infrared communication, the TransferJet (the registered trademark) and the like may be adopted. However, when the NFC or TransferJet having the extremely short communication-possible distance is used, like the above illustrative embodiments, the position registration unit 310 can receive and transmit the current position information LD of the portable device 400 at a state where the portable device 400 is close to the printer 200, as described above, so that it is possible to register the correct printer position information 222 with the printer 200. In the meantime, the user may input the position information, which is received by using the portable device 400 or a device different from the portable device 400 and having the GPS function, through the operation unit 260 of the printer 200, thereby registering the printer position information 222 with the printer 200.

(6) In the above illustrative embodiments, the printer position information 222 is stored in the respective printers 200A to 200C. Instead of this configuration, the printer position information 222 of the printers 200A to 200C in the system may be stored in a management server. In this case, the information indicating the printing conditions to which the printers 200A to 200C in the system can correspond may be stored in the management server. In this way, the management server can determine the printer, which can correspond to the printing conditions based on the printing job, from the printers 200A to 200C in the system. In this case, the processing of steps S10 to S55 in the printing processing of FIG. 4 is executed between the portable device 400 and the management server. In the meantime, the management server may be a server that is connected to the Internet or a local server that is provided in the LAN 80. However, when the printer position information 222 is stored in the respective printers 200A to 200C, like the above illustrative embodiments, it is not necessary to provide the management server, so that it is possible to establish the system that can enable the appropriate printer to execute the printing more easily.

(7) In the printing processing of FIG. 5, the terminal information transmission unit 340 of the printer driver 300 transmits the terminal information SD including the condition information indicating the printing conditions to the printer 200 (step S25 in FIG. 5) and the communication control unit 100 of the printer 200 determines whether the printer can correspond to the printing conditions designated by the condition information. For example, when the system is established using the printers of the same type, the printing conditions that can basically correspond are the same between the printers of the system. Therefore, the transmission processing of the condition information and the processing of determining whether it is possible to correspond to the printing conditions designated by the condition information may be omitted.

(8) In the above illustrative embodiments, the printing instruction unit 360 transmits the printing job including the printing image data, as the printing instruction. However, for example, when the image data is preserved in the management server and the like, the printing instruction unit 360 of the portable device 400 may transmit the printing instruction, which does not include the printing image data, to the specific printer, and the printer having received the printing instruction may access the management server and receive the printing image data from the management server.

(9) Also, in the above illustrative embodiments, the printing instruction unit 360 directly transmits the printing job, which enables the specific printer to execute the printing, to the specific printer. Instead of this configuration, when the system includes a management server, the printing instruction unit 360 may transmit the printing job, which enables the specific printer to execute the printing, to the management server and the management server may transmit the printing job to the specific printer.

(10) Also, in the third illustrative embodiment, when the job transmission instruction is received from the user after the specific printer is determined, the printing instruction unit 360 immediately transmits the printing job to the specific printer. Instead of this configuration, when the job transmission instruction is received from the user after the specific printer is determined and when the inter-apparatus distance D between the portable device 400 and the specific printer becomes the reference value Dth or smaller, the printing instruction unit 360 may transmit the printing job to the specific printer.

(11) In the above illustrative embodiments, the printer position information is the coordinate information including the latitude and the longitude. However, the printer position information may be information indicating an address, a room number associated with an office floor map, and the like, for example. When the printer position information is used in combination with the terminal position information, the printer position information may be information that can specify the distance between the printer 200 and the portable device 400 with necessary precision.

(12) In the above illustrative embodiments, a part of the configuration implemented by the hardware may be replaced with software. On the contrary, a part of the configuration implemented by the software may be replaced with the hardware.

(13) When a part or entirety of the functions of the invention is implemented by the software, the software (computer program) may be provided with being stored in a computer-readable recording medium. The 'computer-readable recording medium' is not limited to a portable recording medium such as a memory card and a CD-ROM and may include an internal storage device in a computer such as RAMs and ROMs and an external storage device that is connected to the computer, such as a hard disk drive.

Illustrative embodiments of the invention can provide at least the following illustrative, non-limiting embodiments.

The terminal apparatus may further comprise a first transmission unit configured to transmit condition information, which indicates a printing condition of the printing based on the printing instruction, to each of the printers. The receiving unit may be configured to receive at least one of the distance information and the printer position information from a printer that is able to execute the printing in accordance with the printing condition indicated by the condition information, of the printers.

According thereto, since at least one of the distance information and the printer position information is received from the printer that can execute the printing in accordance with the printing conditions, it is possible to appropriately select the printer that is enabled to execute the printing.

The terminal apparatus may further comprise a registration unit configured to register the printer position information, which indicates the position of each printer, with each of the printers prior to the printing instruction. The registration unit may comprise a first reception unit configured to receive a predetermined operation from a user. The registration unit may be configured to register the terminal apparatus information at a time at which the predetermined operation is received with a corresponding printer of the printers as the printer position information.

According thereto, it is possible to easily register the information, which indicates the position of the printer, with the printer.

The printing instruction unit may be configured to transmit the printing instruction for printing execution to the specific printer in a case where a distance between the terminal apparatus and the specific printer is a reference value or smaller. The printing instruction unit may be configured not transmit the printing instruction for printing execution to the specific printer in a case where the distance between the terminal apparatus and the specific printer is larger than the reference value.

According thereto, it is possible to enable the printer having the distance to the terminal apparatus, which is the reference value or smaller, to execute the printing. As a result, it is possible to suppress the printing from being executed in a printer that is excessively distant from the terminal apparatus.

The printing instruction unit may comprise a second position receiving unit configured to periodically receive the terminal position information in a case where the distance between the terminal apparatus and the printer is larger than the reference value so that the printing instruction is not transmitted to the specific printer. In a case where the distance between the terminal apparatus and the specific printer becomes the reference value or smaller by virtue of a movement of the terminal apparatus, the printing instruction unit may be configured to transmit the printing instruction for printing execution to the specific printer.

According thereto, it is possible to execute the printing at appropriate timing as the user moves.

The choosing unit may be configured to choose one printer having the shortest distance to the terminal apparatus as the specific printer. The printing instruction unit may be configured to transmit the printing instruction for printing execution to the chose specific printer.

According thereto, since the printer having the shortest distance to the terminal apparatus is enabled to execute the printing, it is possible to improve the user's convenience.

The terminal apparatus may further comprise a second reception unit configured to receive an instruction enabling the specific printer of the one or more chose printers to execute the printing from a user. The printing instruction unit may be configured to transmit the printing instruction for printing execution to the specific printer upon receiving the instruction enabling the specific printer to execute the printing from the user.

According thereto, when the instruction is received from the user after the specific printer is determined, the printing instruction is transmitted. Therefore, it is possible to suppress the printing instruction from being transmitted to a printer that is not suitable for the user.

The choosing unit may be configured to choose a plurality of printers having a distance to the terminal apparatus shorter than a reference value. The terminal apparatus may further comprise a third reception unit configured to receive a selection instruction selecting one printer of the chose printers as the specific printer from a user. The printing instruction unit may be configured to transmit the printing instruction for printing execution to the specific printer selected by the selection instruction.

According thereto, the user can conveniently use the printer because it is possible to easily select a printer, which is to execute the printing, from the printers having the relatively short distances to the terminal apparatus.

The terminal apparatus may further comprise: a display unit; and a display control unit configured to control the display unit to display a notification display for notifying a position of the specific printer to a user. The notification display may comprise information indicating a direction of the position of the specific printer, starting from a position of the terminal apparatus.

According thereto, since the notification display, which includes a direction of the printer of the transmission destination from the terminal apparatus, is displayed, the user can appropriately recognize the position of the printer of the transmission destination.

The terminal apparatus may further comprise a second transmission unit configured to transmit the terminal position information to each of the printers. The receiving unit may be configured to receive the distance information, which indicates the distance between each of the printers and the terminal apparatus, from each of the printers, wherein the distance information is generated on the basis of the printer position information stored in each of the printers and the terminal position information.

According thereto, since the distance information is generated from the printer, it is possible to reduce the processing load of the terminal apparatus.

The receiving unit may be configured to receive the printer position information from each of the printers. The receiving unit may comprise a distance information generation unit configured to generate the distance information on the basis of the terminal position information and the printer position information.

According thereto, since the distance information is generated from the terminal apparatus, it is possible to reduce the processing load of the printer.

The receiving unit of the terminal apparatus may be configured to receive the terminal position information at a state where the terminal apparatus and the printer are able to perform communication by executing the NFC communication.

A communication distance of the NFC communication is very short. Therefore, according to the above configuration, the terminal apparatus receives the terminal position information at a position that is very close to the printer. As a result, it is possible to store the printer position information, which correctly indicates the position of the printer, in the printer.

The receiving unit may be configured to receive the terminal position information when the terminal apparatus transitions to the state where the terminal apparatus and the printer are able to perform communication by executing the NFC communication.

The communication distance of the NFC communication is very short. Therefore, according to the above configuration, the terminal apparatus receives the terminal position information at a position that is very close to the printer. As a result, it is possible to store the printer position information, which correctly indicates the position of the printer, in the printer.

Although the invention has been described with reference to the illustrative embodiments and the modified embodiments, the illustrative embodiments described above are provided to easily understand the invention, not to limit the invention. The invention can be changed and improved without departing from the scope of the invention and the claims and includes the equivalents thereof.

What is claimed is:

1. A terminal apparatus comprising:
a processor; and
a memory storing instructions, the instructions, when executed by the processor, causing the terminal apparatus to perform operations comprising:
  a first position receiving process of receiving terminal position information indicating a position of the terminal apparatus;
  a receiving process of receiving a plurality of distance information corresponding to each of printers that are printer candidates to execute a printing, wherein each of the plurality of distance information is generated on the basis of coordinate information, which includes a latitude and a longitude indicating a position of the corresponding printer, and the terminal position information;
  a choosing process of preferentially choosing one or more printers having a short distance to the terminal apparatus, from the printers based on the distance information; and
  a printing instruction process of transmitting a printing instruction for printing execution to a specific printer of the one or more chosen printers.

2. The terminal apparatus according to claim 1, wherein the operations further comprise:
a first transmission process of transmitting condition information, which indicates a printing condition of the printing based on the printing instruction, to each of the printers, and
wherein the receiving process comprises receiving at least one of the distance information and the printer position information from a printer, of the printers, that is able to execute the printing in accordance with the printing condition indicated by the condition information.

3. The terminal apparatus according to claim 1, wherein the operations further comprise:
a registration process of, for each of the printers, registering the printer position information indicating the position of the respective printer, prior to the printing instruction,
wherein the registration process comprises a first reception process of receiving a predetermined operation from a user, and
wherein the registration process comprises registering the terminal position information, as the printer position information, at a time at which the predetermined operation is received with a corresponding printer of the printers.

4. The terminal apparatus according to claim 1,
wherein the printing instruction process comprises transmitting the printing instruction for printing execution to the specific printer in a case where a distance between the terminal apparatus and the specific printer is a reference value or smaller, and wherein the printing instruction process causes the terminal apparatus not to transmit the printing instruction for printing execution to the specific printer in a case where the distance between the terminal apparatus and the specific printer is larger than the reference value.

5. The terminal apparatus according to claim 4, wherein the printing instruction process comprises a second position receiving process of periodically receiving the terminal position information in a case where the distance between the terminal apparatus and the printer is larger than the reference value, and wherein in a case where the distance between the terminal apparatus and the specific printer becomes the reference value or smaller by virtue of a movement of the terminal apparatus, the printing instruction process comprises transmitting the printing instruction for printing execution to the specific printer.

6. The terminal apparatus according to claim 1, wherein the choosing process comprises choosing one of the printers having the shortest distance to the terminal apparatus as the specific printer, and wherein the printing instruction process comprises transmitting the printing instruction for printing execution to the chosen specific printer.

7. The terminal apparatus according to claim 6, wherein the operations further comprise:

a second reception process of receiving an instruction enabling the specific printer of the one or more chosen printers to execute the printing from a user, and wherein the printing instruction process comprises transmitting the printing instruction for printing execution to the specific printer upon receiving, from the user, the printing instruction enabling the specific printer to execute the printing from the user.

8. The terminal apparatus according to claim 1, wherein the choosing process comprises choosing a plurality of printers having a distance to the terminal apparatus shorter than a reference value, wherein the operations further comprise a third reception process of receiving, from a user, a selection instruction selecting one printer of the chosen plurality of printers as the specific printer from a user, and wherein the printing instruction process comprises transmitting the printing instruction for printing execution to the specific printer selected by the selection instruction.

9. The terminal apparatus according to claim 1, further comprising:

a display unit; and a display control unit configured to control the display unit to display a notification display for notifying a position of the specific printer to a user, wherein the notification display comprises information indicating a direction of the position of the specific printer, relative to a position of the terminal apparatus.

10. The terminal apparatus according to claim 1, wherein the operations further comprise:

a second transmission process of transmitting the terminal position information to each of the printers, and wherein the receiving process comprises receiving the distance information, which indicates the distance between each of the printers and the terminal apparatus, from each of the printers, wherein the distance information is generated on the basis of the printer position information stored in each of the printers and the terminal position information.

11. The terminal apparatus according to claim 1, wherein the receiving process comprises receiving the printer position information from each of the printers, and wherein the receiving process comprises a distance information generation process of generating the distance information on the basis of the terminal position information and the printer position information.

12. A terminal apparatus comprising:

a processor; and a memory storing instructions, the instructions, when executed by the processor, causing the terminal apparatus to perform operations comprising:

a first position receiving process of receiving terminal position information indicating a position of the terminal apparatus;

a acquisition process of receiving a plurality of distance information corresponding to each of printers that are printer candidates to execute a printing, wherein each of the plurality of distance information is generated on the basis of printer position information indicating a position of the corresponding printer and the terminal position information, and wherein at least one of the distance information and the printer position information is transmitted from each of the printers to the terminal apparatus;

a choosing process of preferentially choosing one or more printers having a short distance to the terminal apparatus from the printers based on the distance information; and a printing instruction process of transmitting a printing instruction for printing execution to a specific printer of the one or more chosen printers.

13. A system comprising a terminal apparatus and a printer, wherein the terminal apparatus comprises a processor and a memory storing instructions, the instructions, when executed by the processor, causing the terminal apparatus to perform operations comprising:

a receiving process of receiving terminal position information, which indicates a position of the terminal apparatus, by using coordinate information including a latitude and a longitude indicating a position of the terminal apparatus; and a transmission process of transmitting the terminal position information to the printer by executing a short-range wireless communication, and wherein the printer comprises a processor and a memory storing instructions, the instructions, when executed by the processor of the printer, cause the printer to perform operations comprising:

a reception process of receiving the terminal position information from the terminal apparatus by executing the short-range wireless communication; and a storing process of storing the received terminal position information in a memory, as printer position information indicating a position of the printer.

14. The system according to claim 13, wherein the receiving process comprises receiving the terminal position information in a state where the terminal apparatus and the printer are able to perform communication by executing the short-range wireless communication.

15. A terminal apparatus comprising:
a processor; and
a memory storing instructions, the instructions, when executed by the processor, causing the terminal apparatus to perform operations comprising:
- a receiving process of receiving terminal position information, which indicates a position of the terminal apparatus, by using coordinate information including a latitude and a longitude indicating a position of the terminal apparatus; and
- a transmission process of transmitting the terminal position information to the printer by executing a short-range wireless communication, wherein the transmission process comprises transmitting the terminal position information to the printer when the terminal apparatus transitions to a state where the terminal apparatus and the printer are able to perform communication by executing the short-range wireless communication.

16. The terminal apparatus according to claim 15,
wherein the receiving process comprises receiving the terminal position information when the terminal apparatus transitions to the state where the terminal apparatus and the printer are able to perform communication by executing the short-range wireless communication.

17. A non-transitory computer-readable medium storing instructions, the medium being readable by a computer of a terminal apparatus, wherein the instructions, when executed by the computer, cause the terminal apparatus to perform:
- a position receiving function of receiving terminal position information indicating a position of the terminal apparatus;
- a receiving function of receiving a plurality of distance information, which corresponds to each of printers that are printer candidates to execute a printing, each of the plurality of distance information being generated on the basis of coordinate information, which includes a latitude and a longitude indicating a position of the corresponding printer, and the terminal position information;
- a choosing function of preferentially choosing one or more printers having a short distance to the terminal apparatus based on the distance information; and
- a printing instruction function of transmitting a printing instruction for printing execution to a specific printer of the one or more chosen printers.

18. A non-transitory computer-readable medium storing instructions, the medium being readable by a computer of a terminal apparatus, wherein the instructions, when executed by the computer, causes the terminal apparatus to perform:
- a position receiving function of receiving terminal position information indicating a position of the terminal apparatus;
- a receiving function of receiving a plurality of distance information, which corresponds to each of printers that are printer candidates to execute a printing, each of the plurality of distance information being generated on the basis of coordinate information, which includes a latitude and a longitude indicating a position of the corresponding printer, and the terminal position information, and at least one of the distance information and the printer position information being transmitted from each of the printers to the terminal apparatus;
- a choosing function of preferentially choosing one or more printers having a short distance to the terminal apparatus from the printers based on the distance information; and
- a printing instruction of transmitting a printing instruction for printing execution to a specific printer of the one or more chosen printers.

19. A non-transitory computer-readable medium storing instructions, the medium being readable by a computer of a terminal apparatus, the instructions, when executed by the computer, cause the terminal apparatus to perform:
- a receiving function of receiving terminal position information, which indicates a position of the terminal apparatus, by using coordinate information including a latitude and a longitude indicating a position of a the terminal apparatus; and
- a transmission function of transmitting the terminal position information to the printer by executing a short-range wireless communication, wherein the transmission function transmits the terminal position information to the printer when the terminal apparatus transitions to a state where the terminal apparatus and the printer are able to perform communication by executing the short-range wireless communication.

20. The terminal apparatus according to claim 15, wherein the coordinate information is determined by a global positioning system.

21. The terminal apparatus according to claim 15, wherein the short-range wireless communication comprises at least one of near field communication according to NFC standards, Bluetooth, an infrared communication and TransferJet.

22. The terminal apparatus according to claim 15, wherein the short-range wireless communication is near field communication according to NFC standards.

* * * * *